United States Patent

Keller

[11] 4,040,680
[45] Aug. 9, 1977

[54] ROCK BIT HAVING A BALL BEARING RACEWAY WITH ANTI-GALLING MATERIAL

[75] Inventor: Wilbur S. Keller, Arlington, Tex.

[73] Assignee: Dresser Industries, Inc., Dallas, Tex.

[21] Appl. No.: 720,716

[22] Filed: Sept. 7, 1976

[51] Int. Cl.² .............................................. F16C 19/00
[52] U.S. Cl. ....................................... 308/8.2; 308/174
[58] Field of Search ................ 308/8.2, 239, 174, 241, 308/216, 235; 175/372, 228

[56] References Cited

U.S. PATENT DOCUMENTS

| 3,001,837 | 9/1961 | Lamson et al. ................ 308/241 X |
| 3,079,204 | 2/1963 | Lamson et al. ................ 308/241 X |
| 3,235,316 | 2/1966 | Whanger ...................... 308/239 X |
| 3,360,312 | 12/1967 | De Wit et al. ................ 308/241 X |
| 3,620,580 | 11/1971 | Cunningham ................... 308/8.2 |
| 3,950,041 | 4/1976 | Miglierini .................... 308/8.2 |

*Primary Examiner*—Robert R. Song
*Assistant Examiner*—Gene A. Church
*Attorney, Agent, or Firm*—Eddie E. Scott

[57] ABSTRACT

Galling in the ball bearing raceway of a rotary rock bit is reduced even when the thrust bearings of the rock bit have worn to the point that the ball bearings are loaded by out thrust. The radius of the ball bearing raceway in the bearing pin and/or the cutter includes an inlay of anti-galling material. The anti-galling material insures that any material worn from the raceway will not harm the other bearing elements.

10 Claims, 4 Drawing Figures

ROCK BIT HAVING A BALL BEARING RACEWAY WITH ANTI-GALLING MATERIAL

BACKGROUND OF THE INVENTION

The present invention relates to the art of earth boring and, more particularly, to a rotary rock bit with an improved bearing system having improved performance and longer lifetime characteristics. The present invention is an improvement in a rotary rock bit which includes a ball bearing system, i.e., a row of balls disposed in a pair of registering circumferential raceways, one in the bearing cavity of the cutter, and the other in the bearing pin on which the cutter rotates. Such bearings often fail in fatigue, by spalling of the raceways. Small pieces of metal are loosened from the raceways and find their way between other parts of the bearing, where they cause damage by being ground into the raceway or into confronting surfaces of other bearing elements. The net effect of such spalling is to reduce the life of the bearing, causing the cutter assembly to be retired before its cutting structure is completely dulled.

The bearing system of the present invention is especially adapted for use on that type of rotary rock bit popularly known as a three cone bit; however, its use is not restricted thereto and the bearing system of the present invention can be used in other rotary rock bits wherein an improved bearing system is required. A three cone bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones thereby providing a longer useful lifetime for the cones. This has resulted in the bearing system being first to fail during the drilling operation. Consequently, a need exists for an improved bearing system to extend the useful lifetime of the bit.

In order to obtain high penetration rates with a rotary rock bit in some formations, it is necessary to apply heavy loads on the bit and to operate the bit at a moderate speed. With other formations only moderate loads are required but the bit must be operated at relatively high speeds. In addition, the rock bit is subjected to temperature extremes. The drilling operation may be conducted thousands of feet underground wherein elevated temperatures are encountered. In view of the foregoing circumstances, it can be appreciated that a bearing system for a rotary rock bit must include exceptional performance characteristics in a limited geometrical configuration. Since the entire drill string must be withdrawn to replace the bit when it fails, it is highly desirable to have the bearing system operate for an extended period of time.

DESCRIPTION OF THE PRIOR ART

In U.S. Pat. No. 2,595,903 to K. H. Swart, patented May 6, 1952, a three cone rock bit is shown. The bit includes three shanks which are assembled together to form the bit. The lower end of each shank is formed into a journal and a generally conical tooth cutter is received over the journal. The bearing system includes friction-type bearings and anti-friction bearings. This patent sets out some of the problems encountered with rotary rock bits.

In U.S. Pat. No. 3,235,316 to J. R. Whanger, patented Feb. 15, 1966, a journal bearing for a rock bit is shown with alternating surface areas of wear-resistant and anti-galling materials. The bearing system disclosed in this patent includes grooves in one of the rotatable members with a soft metal having anti-galling characteristics positioned in the grooves.

In U.S. Pat. No. R. 28,625 to Robert A. Cunningham, patented Nov. 25, 1975, a rock drill with increased bearing life is shown. The invention is applicable to all types of rock drills in which a rolling cutter is rotatably mounted on a fixed shaft member with an interposed ball bearing, and is especially useful in the newer rock bits provided with a lubricant system and a highly effective seal. Heretofore, the ball bearing has served as a means for transmitting loads from cutter to shaft, including both radial loads and axial loads. The inventor has modified the bearing structure in such a way that at least outward thrust loads and preferably radial loads as well no longer pass through the balls, i.e., from the raceway of the cone through the balls to the corresponding raceway on the bearing pin. This is accomplished by relieving or deepening either or both raceways, preferably in a non-uniform fashion so that the deepest relief is in the outboard portion of the bearing pin raceway or the inboard portion of the cone raceway or both. One or more pairs of transversely extending friction bearing surfaces are disposed on the pair of members to absorb such thrust.

The important effect of this improvement is the reduction or elimination of spalling of the ball raceways thus eliminating metal particles that othewise could find their way between the confronting surfaces of other bearing members, where they are likely to wreck havoc. The overall effect is to increase the life of the bearing, making it last as long as the cutting structure of the bit.

SUMMARY OF THE INVENTION

The present invention provides a novel bearing system for a rotary rock bit that will reduce galling in the ball bearing raceway of the bit bearing when the thrust bearing has worn to the point that the ball bearings are loaded from out thrust. The radius of the ball bearing raceway in the bearing pin and/or the cutter is initially cut oversize and an inlay of anti-galling material is applied. The anti-galling material insures that any material worn from the ball bearing raceway will not harm the bearing elements and acts as a solid lubricant. The above and other features and advantages of the present invention will become apparent from a consideration of the following detailed description of the invention when taken in conjunction with the drawings.

DETAILED DESCRIPTION OF THE INVENTION

Figure 1:
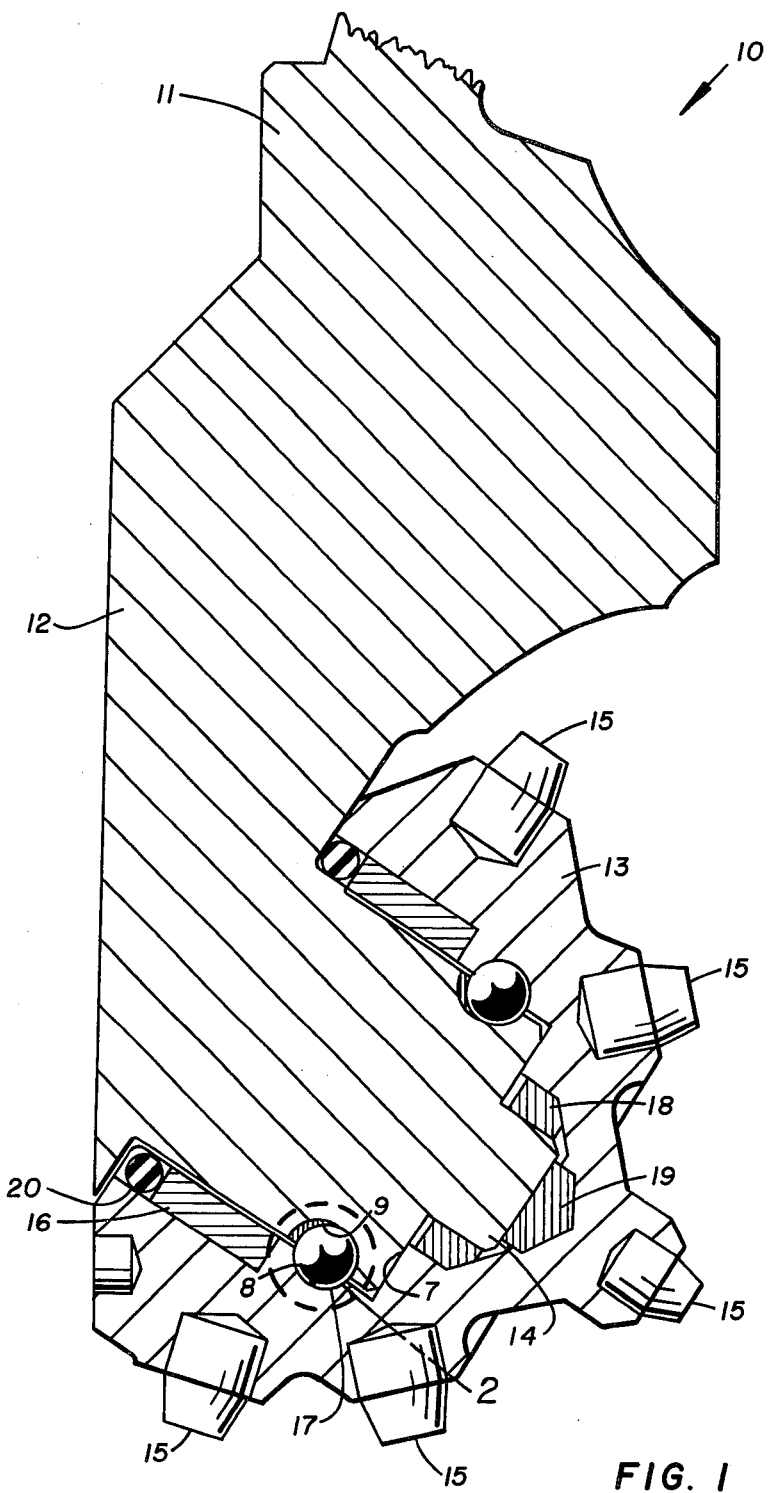
FIG. 1 is an illustration of a rotary rock bit constructed in accordance with the present invention.

Referring now to FIG. 1, a sectional view of one arm 12 of a rotary rock bit 10 is shown. It is to be understood that the structure of the other arms are substantially identical to the arm 12. A cutter 13 is rotatably positioned on a journal portion of the arm 21 and adapted to disintegrate the earth formations as the bit 10 is rotated. The cutting structure 15 on the surface of cutter 13 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 13.

The body 11 of the bit includes a threaded portion that allows the bit 10 to be connected to the lower end of a rotary drill string (not shown). The bit 10 also includes a central passageway extending along the central axis of the bit to allow drilling fluid to enter from the upper section of the drill string (not shown) immediately above and pass downward to the bottom of the well bore to flush cuttings and drilling debris from the well bore.

The journal portion of arm 12 consists of the bearing pin 14 upon which the cutter 13 is mounted. A plurality of bearing systems are located in the bearing area between the cutter 13 and the bearing pin 14. The bearing systems in the bearing area include an outer friction bearing 16, a series of ball bearings 17, an inner friction bearing 18, and a thrust button 19. A seal 20 is positioned between the cutter 13 and the bearing pin 14. This seal 20 retains lubricant in the bearing area around the bearing systems and prevents any materials in the well bore from entering the bearing area.

Figure 2:
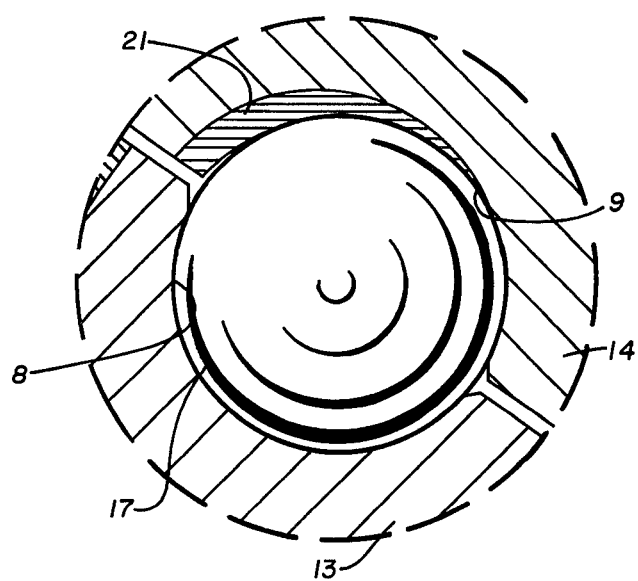
FIG. 2 is an enlarged view of a portion of the ball bearing raceway of the bit shown in FIG. 1.

Referring now to FIG. 2, an enlarged view of the ball bearing system of the rotary rock bit 10 is shown. The radius of the ball bearing raceway 8 in the cone cutter 13 is only slightly larger than the radius of the balls 17 that make up the ball bearing system. The radius of the ball bearing raceway 9 in the bearing pin 14 is initially cut oversize. The enlarged portion of the ball raceway 9 is filled with a layer of anit-galling material 21. The anti-galling material may be either metallic or non-metallic or a composition consisting of both types of materials. Examples of the anit-galling material include gold, silver, copper, brass, lead, babbitt, molybdenum disulfied, tetrafluorethylene (TFE), polytetrafluorethylene (PTFE), graphite, copper-PTFE/TFE, molybdenum disulifed-PTFE/TFE, copper-graphite-PTFE/TFE or any other anit-gilling material or composition thereof. The hardness of the anti-galling material may be controlled and any material worn from the ball raceway 9 will not harm the other bearing elements of the bit. The anti-galling material will act as solid lubricant.

Referring now to both FIGS. 1 and 2, the ball bearing raceway 8 on the cutter 13 and the ball bearing raceway 9 on the bearing pin 14 are located such that when the cone cutter 13 is assembled on the bearing pin 14, the layer of anti-galling material 21 is on the side of the raceway 9 nearest the arm 12 of the bit 10. When the cutter 13 contacts the formations during the drilling operation a thrust load is imposed upon the cutter. The thrust load is divided into an out thrust load component that is substantially parallel to the axis of cutter rotation and a radial thrust load component that is substantially perpendicular to the axis of cutter rotation. In general, the radial load is transmitted from the cutter 13 to the friction bearings 16 and 18 and from the friction bearings 16 and 18 to the bearing pin 14. The out thrust load is transmitted from the cutter 13 to the bearing pin 14 through the thrust button 19 and the thrust flange 7 between the friction bearing 18 and ball bearing system 17.

If the ball bearing system is allowed to carry a portion of the out thrust load when the thrust button 19 and the thrust flange had become worn, damage can result. For example, the bearing could fail in fatique, by spalling of the ball bearing raceways. Small pieces of metal would then be loosened from the raceways and find their way between other parts of the bearing, where they would cause damage by being ground into raceway or into confronting surfaces of other bearing elements. The net effect of such spalling would be to reduce the life of the bearing, causing the cutter to be retired before its cutting structure is completely dulled.

The ball bearing raceways 8 and 9 retain the ball bearings and serve to lock the cutter 13 on the bearing pin 14. The enlarged portion of the ball raceway in the bearing pin 14 is filled with an inlay 21 of anit-galling material 21. The hardness of the anti-galling material 21 may be controlled and any material worn from the ball raceway will not harm the other bearing elements of the bit. The anti-galling material will act as a solid lubricant. The out thrust load component of the thrust load is basically carried by the thrust flange 7 and the thrust button 19. When these elements become worn the ball bearings 17 will begin to run against the anti-galling layer 21. The anit-galling material will act as a solid lubricant and extend the useful lifetime of the bit 10.

Figure 3:
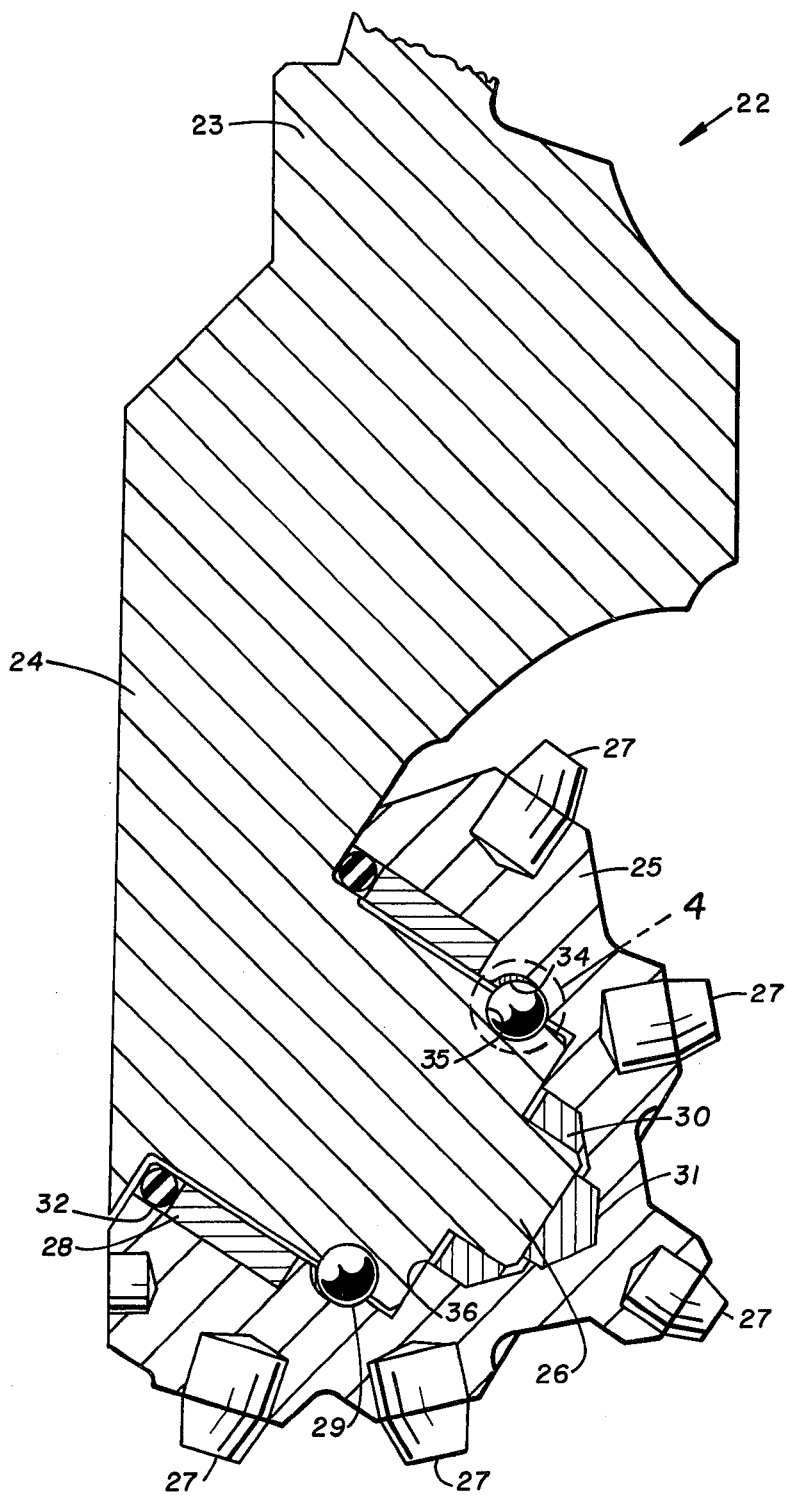
FIG. 3 is an illustration of another embodiment of a rotary rock bit constructed in accordance with the present invention.

Referring now to FIG. 3, a sectional view of one arm 24 of another embodiment of a rotary rock bit 22 incorporating the present invention is shown. It is to be understood that the structure of the other arms are substantially identical to the arm 24. A cutter 25 is rotatably positioned on a journal portion of the arm 24 and adapted to disintegrate the earth formations as the bit 22 is rotated. The cutting structure 27 on the surface of cutter 25 contacts and disintegrates the formations in a manner that is well known in the art. The cutting structure 27 is shown in the form of tungsten carbide inserts. However, it is to be understood that other cutting structures such as steel teeth may be used as the cutting structure on the cone cutter 25.

The body 23 of bit 22 includes a threaded portion that allows the bit 22 to be connected to the lower end of a rotary drill string (not shown). The bit 22 also includes a central passageway extending along the central axis of the bit to allow drilling fluid to enter from the upper section of the drill string (not shown) immediately above and pass downward to the bottom of the well bore to flush cuttings and drilling debris from the well above.

The journal portion of arm 24 consists of the bearing pin 26 upon which the cutter 25 is mounted. A plurality of bearing systems are located in the bearing area between the cutter 25 and the bearing pin 26. The bearing systems in the bearing area include an outer friction bearing 28, a series of ball bearings 29, an inner friction bearing 30, and a thrust button 31. A seal 32 is positioned between the cutter 25 and the bearing pin 26. This seal 32 retains lubricant in the bearing area around the bearing systems and prevents any materials in the well bore from entering the bearing area.

Figure 4:
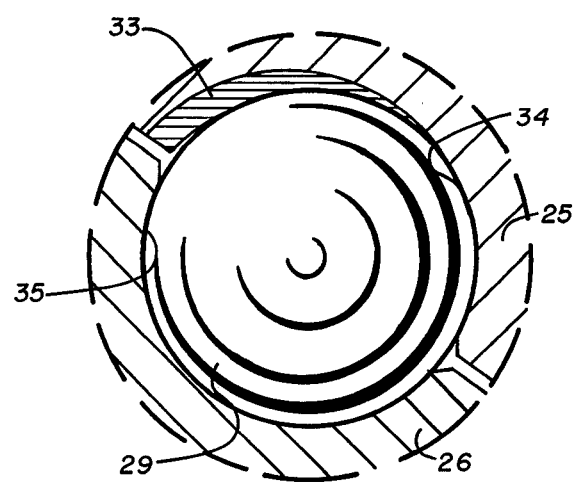
FIG. 4 is an enlarged view of a portion of the ball bearing raceway of the bit shown in FIG. 3.

Referring now to FIG. 4, an enlarged view of the ball bearing system of the rotary rock bit 22 is shown. The radius of the ball bearing raceway 35 in the bearing pin 26 is only sightly larger than the radius of the balls 29 that make up the ball bearing system. The radius of the ball bearing raceway 34 in the cone cutter 25 is initially cut oversize, substantially larger than the radius of the balls 29 that make up the ball bearing system. The enlarged portion of the ball raceway 34 in the cone cutter 25 is then filled with a layer of anit-galling material 33. The anti-galling material may be either metallic or nonmetallic or a composition consisting of both types of materials. Examples of the anti-galling material include gold, silver, copper, brass, lead, babbitt, molybdenum disulfied, tetrafluorethylene (TFE), polytetrafluorethylene (PTFE), graphite, copper-PTFE/TFE, molybdenum disulfied-PTFE/TFE, copper-graphite-PTFE/TFE or any other anit-galling material or composition thereof. The hardness of the anti-galling material may be controlled and any material worn from the ball raceway 34 will not harm the other bearing elements of the bit. The anti-galling material will act as a solid lubricant.

Referring now to both FIGS. 3 and 4, the ball bearing raceway 34 on the cutter 25 and the ball bearing raceway 35 on the bearing pin 26 are located such that when the cone cutter 25 is assembled on the bearing pin 26, the inlay 33 portion of the ball raceway 34 is on the side of the raceway 34 nearest the arm 24 of the bit 22. When the cutter 25 contacts the formations during the drilling operation a thrust load is imposed upon the cutter. The thrust load is divided into an out thrust load component that is substantially parallel to the axis of cutter rotation and a radial thrust load component that is substantially perpendicular to the axis of cutter rotation. In general, the radial load is transmitted from the cutter 25 to the friction bearings 28 and 30 and from the friction bearings 28 and 30 to the bearing pin 26. The out thrust load is transmitted from the cutter 25 to the bearing pin 26 through the thrust button 31 and the thrust flange 36 between the friction bearing 30 and ball bearing system 29.

The ball bearing raceways 34 and 35 retain the ball bearings and serve to lock the cutter 25 on the bearing pin 26. The enlarged portion of the ball raceway in the cone cutter 25 is filled with a layer of anti-galling material 33. The hardness of the anti-galling material may be controlled and any material worn from the ball raceway will not harm the other bearing elements of the bit. The out thrust load component of the thrust load is basically carried by the thrust flange 36 and the thrust button 31. When these elements become worn the ball bearings 29 will begin to run against the anti-galling layer 33. The anti-galling material will act as a solid lubricant and extend the useful lifetime of the bit 22.

The embodiments of an invention in which an exclusive property or privilege is claimed are defined as follows:

1. An earth boring bit that encounters an out thrust load, comprising:
   a bit body;
   a bearing pin extending from said bit body;
   a roller cutter rotatably mounted on said bearing pin;
   bearing means between said cutter and said bearing pin, said bearing means including a multiplicity of ball bearings;
   a cooperating pair of ball bearing raceways, one raceway in said bearing pin and the other raceway in said cutter;
   at least one of said ball bearing raceways having a relieved portion with the relieved portion being positioned so that said out thrust load tends to force said ball bearings toward said relieved portion; and
   an anti-galling material filling said relieved portion so that said out thrust load tends to force said series of bearings toward said anti-galling material.

2. An earth boring bit adapted to contact and disintegrate earth formations thereby encountering an out thrust load, comprising:
   a bit body;
   a bearing pin extending from said bit body;
   a cone cutter rotatably mounted on said bearing pin;
   bearing means between said cutter and said bearing pin, said bearing means including a multiplicity of ball bearings;
   a pair of cooperating raceway grooves for capturing said ball bearings, one of said grooves being located in said bearing pin and the other of said grooves being located in said cutter; and
   at least a portion of at least one of said raceway grooves being filled with an inlay of an anti-galling material whereby said out thrust load will cause said ball bearings to contact said anti-galling material as the bit contacts and disintegrates the earth formations.

3. A rotary rock bit for forming a borehole wherein said bit encounters an out thrust load while forming said borehole, comprising:
   a bit body, a bearing pin depending from said bit body;
   a cone cutter adapted to be mounted on said bearing pin, said cone cutter having a concave cavity and cone mouth positioned over said bearing pin;
   bearing means in said cavity between said bearing pin and said cone cutter, said bearing means including a multiplicity of ball bearings;
   a ball bearing raceway in said cone cutter and a ball bearing raceway in said bearing pin for receiving said ball bearings, at least one of said ball bearing raceways having a relieved portion; and a layer of anti-galling material in said relieved portion, said out thrust load tending to force said series of bearings toward said anti-galling material.

4. A rolling cutter rock bit adapted to contact and disintegrate earth formations thereby encountering an out thrust load, comprising:
   a bit body having a downwardly extending leg;
   a bearing pin projecting from said leg;
   a rolling cutter rotatably mounted on said bearing pin;
   an anti-friction bearing between said cutter and bearing pin in the form of a circumferential row of balls disposed in a pair of registering toroidal raceways on the exterior of the bearing pin and the interior of the cutter, and
   at least a portion of one of said toroidal raceways being comprised of an anti-galling material so that axial thrust created by said out thrust load in the direction from the bearing pin to the leg will eventually cause said balls to contact said anti-galling material thereby causing said anti-galling material to promote rotation of said cutter.

5. An earth boring bit adapted to contact and disintegrate earth formations thereby encountering an out thrust load, comprising:

a bit body having a bearing pin;

a rotatable cutter mounted on said bearing pin with said rotatable cutter establishing an axis of cutter rotation;

a series of ball bearings between said bearing pin and said rotatable cutter, said ball bearings having axial axes substantially parallel to said axis of cutter rotation;

a cutter ball bearing raceway on said cutter for containing said ball bearings, said cutter ball bearing raceway having a radius, with said radius being only slightly larger than the radius of said ball bearings; and a pin ball bearing raceway on said bearing pin for containing said ball bearings, said pin ball bearing raceway having an inlay of anti-galling material opposing the sides of said ball bearings facing said bit body, said out thrust load tending to force said series of bearings toward said anti-galling material.

6. In an earth boring bit that includes a bit body, a bearing pin extending from said bit body, a rotatable cutter mounted on said bearing pin with said rotatable cutter establishing an axis of cutter rotation, and a series of ball bearings between said bearing pin and said cutter with said ball bearings having axial axes substantially parallel to said axis of cutter rotation wherein said bit encounters an out thrust load acting to tend to force said cutter onto said bearing pin, the improvement comprising:

a cutter ball bearing raceway on said cutter;

a pin ball bearing raceway on said bearing pin; and at least one of said ball bearing raceway and said cutter ball bearing raceway having a sidewall portion comprised of anti-galling material, said sidewall portion being located along the axial axes of said ball bearings between said bit body and said ball bearings, said out thrust load tending to force said series of bearings toward said anti-galling material.

7. In an earth boring bit that includes a bit body, a bearing pin extending from said bit body, a rotatable cutter mounted on said bearing pin with said rotatably cutter establishing an axis of cutter rotation, and a series of ball bearings between said bearing pin and said rotatable cutter, wherein said cutter is adapted to contact and disintegrate formations thereby imposing an out thrust load on said cutter substantially parallel to said axis of cutter rotation, the improvement comprising:

first ball bearing raceway means on said cutter for containing said ball bearings; and second ball bearing raceway means on said bearing pin for containing said ball bearings, said second ball bearing raceway means being initially cut oversize and having an inlay of anti-galling material for receiving any out thrust load transmitted from said ball bearings, said out thrust load tending to force said series of bearings toward said anti-galling material.

8. In an earth boring bit that includes a bit body, a bearing pin extending from said bit body, a rotatable cutter mounted on said bearing pin with said rotatable cutter establishing an axis of cutter rotation, and a series of ball bearings between said bearing pin and said cutter, wherein said cutter is adapted to contact and disintegrate formations thereby imposing an out thrust load on said cutter parallel to said axis of cutter rotation acting toward said bit body, the improvement comprising:

a ball bearing raceway on said cutter for containing said ball bearings;

a bearing pin ball bearing raceway on said bearing pin for containing said ball bearings; and an anti-galling material forming a portion of said bearing pin ball bearing raceway for receiving any out thrust load transmitted through said ball bearings, said out thrust load to force said series of bearings toward said anti-galling material.

9. In an earth boring bit that includes a bit body, a bearing pin extending from said bit body, a rotatable cutter mounted on said bearing pin with said rotatable cutter establishing an axis of cutter rotation, and a series of ball bearings between said bearing pin and said cutter, wherein said cutter is adapted to contact and disintegrate formations thereby imposing an out thrust load on said cutter parallel to said axis of cutter rotation acting toward said bit body, the improvement comprising:

a ball bearing raceway on said cutter for containing said ball bearings;

a bearing pin ball bearing raceway on said bearing pin for containing said ball bearings; and an anti-galling material forming a portion of said ball bearing raceway on said cutter for receiving any out thrust load transmitted through said ball bearings, said out thrust load tending to force said series of bearings toward said anti-galling material.

10. In an earth boring bit that includes a bit body, a bearing pin extending from said bit body, a rotatable cutter mounted on said bearing pin with said rotatable cutter establishing an axis of cutter rotation, and a series of ball bearings between said bearing pin and said cutter with said ball bearings having a first radius, wherein said cutter is adapted to contact and disintegrate formations thereby imposing an out thrust load on said cutter substantially parallel to said axis of cutter rotation, the improvement comprising:

a cutter ball bearing raceway on said cutter for containing said ball bearings, said cutter ball bearing raceway having a second radius that is only slightly larger than said first radius;

a pin ball bearing raceway on said bearing pin for containing said ball bearings, said pin ball bearing raceway being initially undercut in the direction of said bit body; and an inlay of anti-galling material in said undercut that will receive any out thrust load from the ball bearings, said inlay having a third radius for receiving said ball bearings, said third radius being only slightly larger than said first radius, said out thrust load tending to force said series of bearings toward said anti-galling material.

* * * * *

UNITED STATES PATENT OFFICE
CERTIFICATE OF CORRECTION

Patent No. 4,040,680  Dated August 9, 1977

Inventor(s) Wilbur S. Keller

It is certified that error appears in the above-identified patent and that said Letters Patent are hereby corrected as shown below:

Column 7, line 32, after "said" first occurrence, -- pin -- should be inserted.

Column 8, line 15, after "load" -- tending -- should be inserted.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*